Dec. 16, 1969     H. WALD     3,484,690
THREE CURRENT WINDING SINGLE STATOR NETWORK
METER FOR 3-WIRE 120/208 VOLT SERVICE
Filed Aug. 23, 1966     2 Sheets-Sheet 1
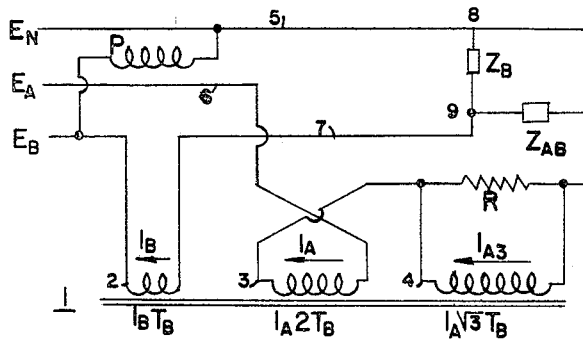
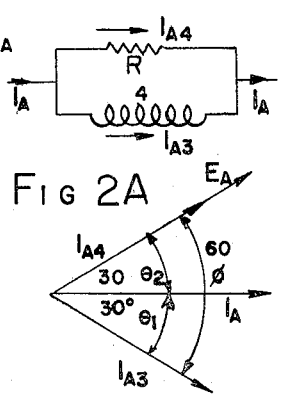
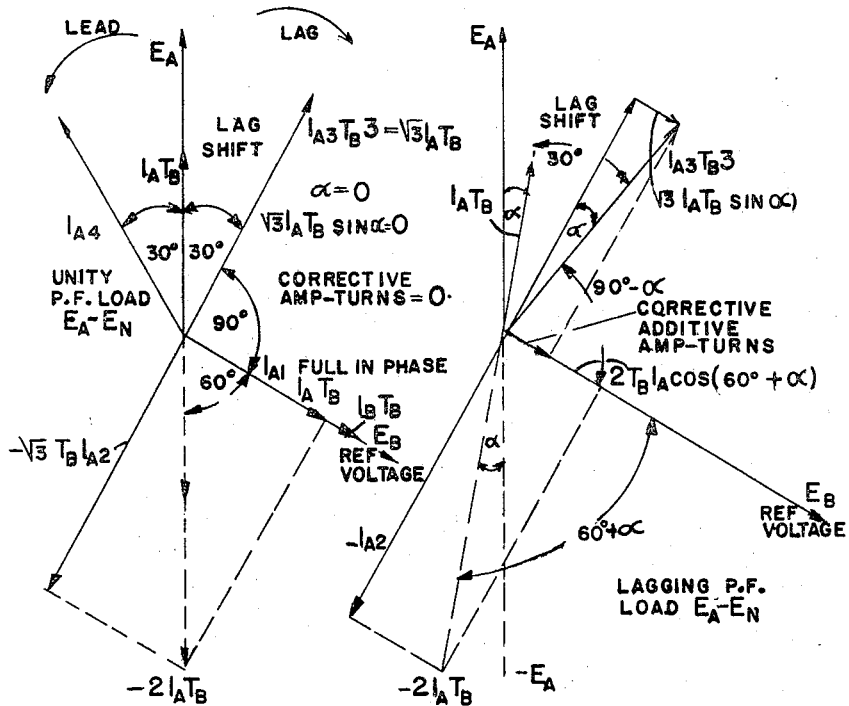
INVENTOR.
Herman Wald Dec. 16, 1969    H. WALD    3,484,690
THREE CURRENT WINDING SINGLE STATOR NETWORK
METER FOR 3-WIRE 120/208 VOLT SERVICE
Filed Aug. 23, 1966    2 Sheets-Sheet 2
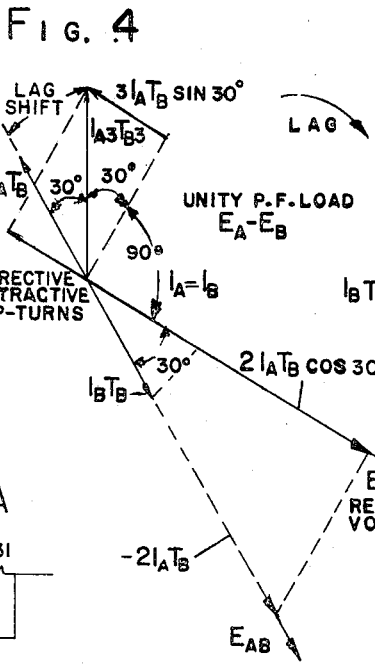
FIG. 4
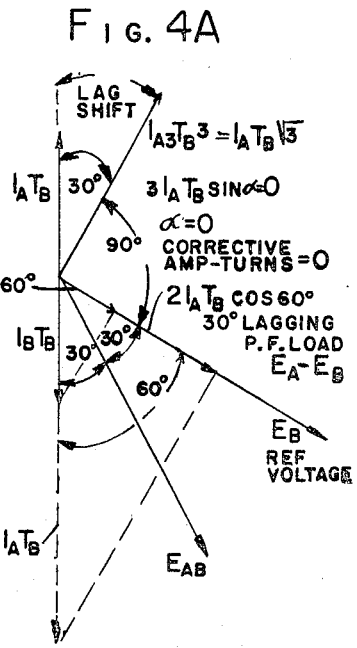
FIG. 4A
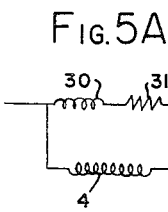
FIG. 5A
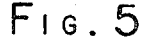
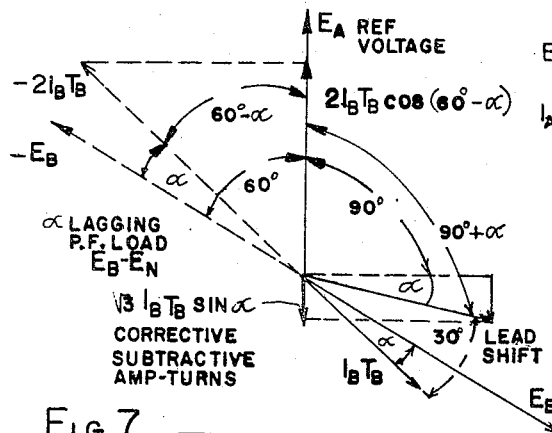
FIG. 5
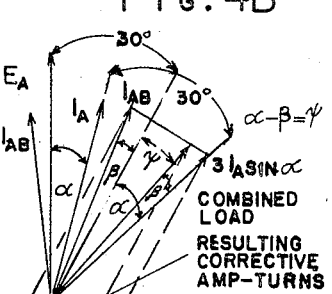
FIG. 4B
FIG 7
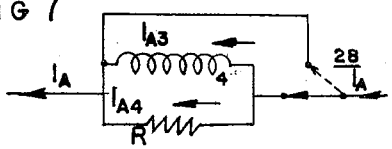
FIG. 6
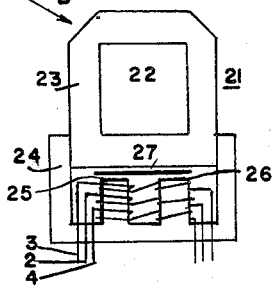
INVENTOR.
Herman Wald United States Patent Office 3,484,690
Patented Dec. 16, 1969

3,484,690
THREE CURRENT WINDING SINGLE STATOR
NETWORK METER FOR 3-WIRE 120/208
VOLT SERVICE
Herman Wald, 97—11 Horace Harding Expressway,
Queens, N.Y. 11368
Filed Aug. 23, 1966, Ser. No. 578,419
Int. Cl. G01r 19/00, 29/16
U.S. Cl. 324—107                    16 Claims

ABSTRACT OF THE DISCLOSURE

This meter operates to pass both phase currents of unity-power factor loads in fully rated flow through respective energizing current coils without phase shifting. For non-unity power-factor loads an additional power factor corrective energization is derived by a 30 degrees shifting of one phase current passing through a third current coil shunted by a resistor to constitute a phase shifting circuit. One of the phase voltages is selected as a reference on the meter potential coil so that at unity power-factor load the 30 degrees shifted corrective current assumes 90 degrees angle having zero watts effect. For non-unity power-factor loads the magnitude of the corrective amp-turns energization is a sine function of the load power factor angle to provide an automatic additional corrective energization in order that the meter shall register the correct energy consumption under all type of loads.

---

This invention relates to improvements in single stator watthour meters or similar devices for metering two phases of a 4-wire, Y-connected 3-phase distribution system, which for purposes of illustration will be considered to be a 120/208 volt 60 cycle system.

Various network meters of this type are designed and used in the present art. Such commercially known systems have adopted two basic methods:

(a) In one method 120 to neutral voltage is applied on the potential coil of the meter necessitating a 60 degrees lag shift of one phase current in addition to reversing the same current to make its position coincide with the voltage vector. This method requires a core reactor of relatively large inductance to obtain the lag shift in one branch of a phase shifting network. The change in permeability of such a reactor for various load currents is, however, sufficiently high to affect the constancy of the phase shift which, in turn, introduces appreciable non-linear errors in the meter reading under varying currents. The required reactor has presented physical difficulties as well.

(b) In the second method 208 volt phase-to-phase voltage is applied to the potential coil of the meter necessitating two phase shifting networks, one to have a 30 deg. lead shift and the other 30 deg. lag shift to obtain phase coincidence with the reference voltage vector. However, the meter reading accuracy is appreciably affected under various loads when using this method due to transformer interaction between the two inductively coupled networks through the current core structure and the non-linearity of the permeability of the reactor core.

Both methods noted above shift the phase currents to be metered by phase shifting networks which by-pass a portion of the line current to be metered. Therefore the errors caused by the non-linearity of the shifting network components are increased inverse in proportion to the ratio of by-pass current to total metered current.

The present invention employs an improved circuit arrangement in which each of the two phase line currents to be metered passes individually through a separate current coil to energize the metering device according to the watt power of both phases at unity power factor load. Thus there is no phase shifting network employed to shift the full line current.

However, for loads differing from unity power factor or loads connected to phase-to-phase voltage having less than 30 deg. power factor angle, further provision is made to derive an additional corrective energization produced by a 30 degrees shifting of one line current passing through a third current coil adopted for this purpose. The necessary 30 deg. shift is easily accomplished by shunting the third coil of correspondingly increased number of turns to provide the required inductance for the lag shift in one branch.

The important advantages of the basic method of this invention, therefore, reside in the fact that the meter reading errors caused by the phase shifting reactor structures are eliminated and as a consequence all non-linearity of the metering current under various load currents is substantially eliminated. Furthermore any error due to the so-called corrective shifting device will be a small percentage of the corrective current (reactive component) and for other than unity power factor loads it will negligibly affect the accuracy of the total power reading. Generally loads in multiple dwellings for this type of network meter application are of the high power factor type.

Accordingly one main object of the present invention is to provide a greatly improved and simplified network metering circuit arrangement to measure simultaneously two phases of a Y-connected 3-phase system allowing the phase currents in fully rated flow to pass the energizing current coils by sending additional corrective energization to compensate for power factor variations.

It is a further important object of the invention to provide a simplified corrective phase shifting shunt circuit arrangement having the corrective current coil as its sole component in one branch whereby the accuracy of the total metered energy is relatively insensitive to variations in load currents.

A further object of the invention is the provision of means associated with the corrective third current coil applying a number of turns for an increased ratio of inductive reactance to resistance in the two branches of the shifter device as required for obtaining the necessary phase shift.

An additional object of the invention is to arrange the measuring circuit by using a lead shift for the corrective current by selecting the required angle relationship or phase sequence between the reference voltage vector and the other voltage vector.

Further objects of the invention lie in the combination of various above mentioned arrangements to form various network meter circuits and also include the various combinations and subcombinations of elements and their inter-relation.

The objects of the invention will be evident from the detailed description in conjunction with the accompanying drawings and for fuller understanding reference will be made to them, in which:

FIGURE 1 is a diagrammatic view of the improved network meter circuit arrangement indicating the various phase loads and currents including the resistively shunted third current coil.

FIGURE 1A is a vector diagram of the phase currents and voltages indicating the operating principles of the invention when supplying unity power factor line-to-neutral loads.

FIGURE 2 is a diagrammatic illustration of a 30 degrees lag shifter having a resistance in shunt to the third corrective current coil.

FIGURE 2A is a vector diagram as referred to FIGURE 2, indicating the phase shifter circuit.

FIGURE 3 is a vector diagram of the phase currents and voltages indicating the operating principles of the invention when supplying energy at a lagging power factor line-to-neutral loads.

FIGURE 4 is a vector diagram of the phase currents and voltages indicating the operating principles of the invention when supplying phase-to-phase unity power factor loads.

FIGURE 4A is a vector diagram of the phase currents and voltages indicating the operating principles of the invention when supplying phase-to-phase 30 deg. lagging power factor loads.

FIGURE 4B is a vector diagram of the combined corrective energization when 120 and 208 volt loads are supplied simultaneously.

FIGURE 5 is a vector diagram of the operating currents and voltages when unity power factor loads are supplied from line-to-neutral voltage and the corrective energization derived from the third current coil is subtractive.

FIGURE 5A illustrates a phase shifter loop circuit when the current is shifted 30 degrees leading.

FIGURE 6 is a diagrammatic view of a conventional single stator, single rotor core structure meter embodying the invention.

FIGURE 7 is fragmentary diagram indicating a simple test method to check the exactness of the corrective phase shifter device.

Referring to the drawings, FIGURE 1 is a schematic diagram of the network meter circuit arrangement showing the two phase voltages and neutral of a Y-connected 3-phase supply system denoted by the reference characters $E_a$, $E_b$, $E_n$, respectively. The meter core structure generally indicated at 1, comprises the current windings 2, 3, 4, respectively. The terminals 8, 9 of the load denoted by $Z_b$ is series with the current winding 2 is connected by leads 5 and 7 to $E_n$ and $E_b$ voltage supply lines allowing a current $I_b$ to pass therethrough. Similarly the terminals 10, 11 of the load denoted by $Z_a$ in series with the reversed current winding 3 is connected by leads 5 and 6 to $E_n$ and $E_a$ voltage supply lines allowing a current $I_a$ to pass therethrough. The corrective current winding 4 is shunted by a resistance element R of relatively low value to form a corrective phase shifting device being inserted in series between load $Z_a$ and current winding 3 to allow the corrective and shifted current to flow therethrough applying additional corrective amp-turns energization.

The voltage winding denoted by the reference numeral P is connected to $E_b$ and neutral $E_n$ serving as a reference vector to measure the watt energy of both phase and corrective amp-turns energization. The correct selection of the phase sequence or phase angle relationship in the lagging or leading direction between the reference vector voltage and the other phase voltage is an important consideration for correct operation as will be explained hereinafter in connection with the operating vector diagrams.

It will be noted that throughout the description $T_b$ equals the turns of winding 2 and will be used at $x$ reference turns in multiples of 2 and 3 respectively for winding 3 ($2T_b$) and winding 4 ($3T_b$)

FIGURE 1A is a vector diagram of the voltage and current vectors indicating the operation of the circuit with unity-power-factor loads connected to $E_a$ and neutral $E_n$. This arrangement has been selected to indicate the phase lag of the corrective $I_{a3}$ current using the $E_b$ voltage as the reference voltage vector on the potential winding of the meter and so the other voltage vector $E_a$ is 120 degrees leading as shown by the arrows. If the current vector $I_a$ is reversed, the $-I_a$ will lag the vector $E_b$ by 60 degrees. Now the $-I_a$ current vector is decomposed into two components, $I_{a1}$ in phase with $I_b$ and the $I_{a2}$ at 90 degrees with $I_b$. From the simple vector relationship we find:

$$-I_{a1} = -I_a \cos 60° = -I_a/2$$

By doubling the amp-turns of winding 3 compared to winding 2, or by selecting two turns for winding 2 of phase B and 4 turns for phase A, we get:

$$-2T_b(I_a \cos 60°) = -|I_a|T_b$$

which is the full in-phase current $I_a$ with respect to the reference vector $E_b$.

In order to determine the number of turns required for the corrective winding 4, we refer at first to the description of the corrective phase shifting device of FIGURE 2 where the 30 degrees lagging branch current $I_{a3}$ will counterbalance the $-I_{a2}$ component having 90 degrees phase angle with respect to $I_b$ vector. It is to be noted that at unity-power-factor loads the phase shifted corrective current component $I_{a3}$ is similarly at 90 degree angle with respect to the reference vector $E_b$, so its watts component is also zero. Therefore the unity-power-factor watthour meter reading is unaffected by the energization of winding 4. However, for non unity-power-factor loads, the actual magnitude of corrective amp-turns $I_{a3}3T_b = \sqrt{3}I_aT_b$ is a function of the sine of the reactive-power-factor angle $\alpha$ and is determined by the selected ratio magnitude of the $I_aT_b$ amp-turns to the corrective $$|I_{n3}|3T_b = \sqrt{3}T_b|I_b| \sin \alpha$$

amp-turns as clearly defined hereinafter, since $\alpha = 0$.

FIGURE 2 illustrates the phase shifting device and the vector relationship of the branch currents with respect to the phase current $I_a$. The shunting resistance R has a very low value, therefore in this parallel combination with winding 4 the driving means is the current and so the relationship is established on the basis of the subdivided currents $I_{a3}$, $I_{a4}$ of approximately equal magnitudes. If the L-R ratio in the current winding branch is proportioned so that the current $I_{a3}$ flowing therethrough lags 60 degrees behind the current $I_{a4}$ of the pure R branch, the equally subdivided branch currents are 30 degrees lagging and leading with respect the line current $I_a$, as given by the vector relationship:

$$I_a\sqrt{3}e^{j\ 30°} + I_a/\sqrt{3}e^{-j\ 30°} = |I_a|$$

therefore the actual magnitude of current flowing through each branch is higher than $I_a/2$ by an amount $$(I_a/\sqrt{3} - I_a/2)$$

It is noted that, if required, a very small adjustable resistance element, not shown on drawing, may be included in series with the current winding branch for setting the correct L-R ratio if the resistance of the current winding itself is insufficient. The adjustment in both branches are inter-dependent. On any disturbance of the balance between the two impedance branches the line current vector $I_a$ will rotate nearer to the branch having a current of higher magnitude. Any final adjustment around the 30 degrees shifting may easily be accomplished by adjusting the branch resistances. It is understood that if the resistance R in the resistive branch is increased, the angle $\theta_2$ between $I_{a4}$ and $I_a$ increases and angle $\theta_1$ decreases to less than 30 degrees. Any such deviation can be compensated for by a proportionate increase of the L-R ratio.

To determine the exact amp-turns ratio of the corrective amp-turns $3B\ I_{a3}$ to the $I_aT_b$ amp-turns, we refer back to the diagram on FIGURE 1A. The two 90 deg. components cancel as follows:

$$2T_b|I_{a3}| = -2T_bI_a \sin 60° = \sqrt{3}|I_a|T_b$$

$$3T_b|I_{a3}| = 3T_b\frac{I_a}{2 \cos 30°} = \sqrt{3}|I_a|T_b$$

from the above equations we get:

$$3T_b|I_{a3}| = 2T_b'|I_{a2}|$$

FIGURE 3 is a vector diagram of the amp-turns and voltages indicating the operating principles of the invention when lagging power-factor loads are supplied from line to neutral voltage. If the power-factor angle is $\alpha$, then the necessary in-phase component for correct power measurement would be: "$I_a \cos \alpha$." However, due to the reversal of the $I_a$ vector, we get a lagging angle of $(60°+\alpha)$ with reference to vector $E_b$ voltage.

Accordingly the projected value would be (when doubling reference turns $T_b$);

$$2T_b I_a [\cos (60°+\alpha)] = I_a 2T_b [\cos 60° \cos \alpha - \sin 60° \sin \alpha] = T_b I_a [\cos \alpha - \sqrt{3} \sin \alpha] \quad (1)$$

the result of Equation 1, indicates that the "$I_a \cos \alpha$" power component to be measured is reduced by a factor $|I_a \sqrt{3} \sin \alpha|$ as a function of $\sin \alpha$, which is reflected as an additive vector component to supply the necessary compensating amp-turns energization. The diagram shows that the $\alpha$ lagging angle of the vector $I_a$ as reversed becomes also a lagging angle which increases the total lagging angle to $(60°+\alpha)$. It is clear that the projection of the $\sin \alpha$ component with the required amp-turns ratio will supply the correct additional amp-turns energization. The required corrective amp-turns, as per Equation 1, shall be $\sqrt{3}$ times the $I_a T_b$ amp-turns in which $T_b$ is the basic 2 turns for the other phase current $I_b$. Thus the corrective amp-turns shall be "$\sqrt{3}\, I_a T_b$." However, as described under FIGURE 1A diagram concerning unity-power-factor loads, we found that a portion of the $I_a$ current is by-passed in the 30° phase shifting device, the turns are therefore increased from $2\sqrt{3}$ to 6 in order to correct the meter reading.

The additional amp-turns energization through the third current winding 4 provides an exact and automatic correction or compensation for the power-factor variations so that a correct watt meter reading is achieved. This is mainly due to the fact that as the power-factor angle increases, the angle $(90 - \alpha)$ between the shifted corrective vector $I_{a3}$ and $E_b$ reference vector decreases proportionally as a function of $\sin \alpha$, as required to obtain automatic correction under any power-factor condition.

FIGURE 4 is a vector diagram of the phase currents and voltages when 208 volt unity-power-factor load is supplied. The diagram indicates that the 208 volt voltage vector $E_{ab}$ has a 30° angle with both $E_a$ and $E_b$ vectors. Due to the reversal and doubling the turns of the $I_a$ current winding, the $I_b T_b$ plus $2I_a T_b$ is projected on the reference vector $E_b$ under 30 degree angle. In addition the third current winding 4 energization with the shifting of 30 deg. lag angle will supply an additional subtractive amp-turns energization as a function of $\sqrt{3} \sin \alpha$, so that the correct total power will be recored by the meter. The following sample calculation illustrates the exactness of the 208 volt power measurement using 120-to-neutral voltage as a potential winding meter reference.

If we assume $I_a$ equal to one ampere and $I_b$ being identical to $I_a$ in a 208 volt supply, the required power reading would be $I_a$ 208 volt="208 watts." By reversing the $I_a$ vector current and doubling its turns, we have a total vector magnitude of $|3I_a T_b|$ having a 30 degree angle with the $E_b$ reference vector which gives a power reading of:

$$3I_a \cos 30° \; 120 \text{ volt} = +312.2 \text{ watts}$$

The "subtractive" component from the phase shifted current is:

$$I_a \sqrt{3} \sin 30° \; 120 \text{ volt} = \sqrt{3}/2 \; 120 \text{ volt} = -104.2 \text{ watts}$$

resulting in a final total reading of "208 watts," thus the above calculation proves the exactness of the power measurement.

FIGURE 4A is a vector diagram of the phase currents and voltages when 208 volt load with 30° lagging power factor is supplied. In this case the $I_a$, $I_b$ current vectors lagging the $E_b$ reference vector by 60 degrees and so the 30 degree lag shifted $I_{a3}$ component will have an exact 90 degrees angle with the $E_b$ vector, therefore its contribution to the watt energy reading is zero.

The following evaluation similarly proves the exactness of the watt power reading. The required energy to be metered would be:

"$I_a \cos 30° \; 208 \text{ volt} = 180 \text{ watts}$"

assuming $I_a$ equal to one ampere. Again by reversing and doubling the turns of $I_a T_b$ we get:

$$3I_a \cos 60° \; 120 \text{ volt} = 3/2 \times 120 = \text{"180 watts"}$$

The phase shifted $I_{a3}$ component (90 deg.) is zero watts. Total reading is 180 watts, as required.

It is interesting to note that under two extreme load conditions such as, unity-power-factor 120-neutral and 30° lagging 208 volt supply, the shifted current component $I_{a3}$ has no effect on the wattmeter reading and the full watt power to the meter is supplied by the $I_a 2T_b$ and $I_b T_b$ ampere-turns. Accordingly the $I_{a3}$ shifted current component contributes only to the wattpower reading when the power-factors of the loads are between the above extreme values.

FIGURE 4B is a vector diagram of the combined corrective energization when 120 and 208 volt loads are supplied simultaneously. This illustration of the correct measuring of the various 120 volt and 208 volt load currents with different power factors indicate that for such combination of loads the corrective energization derived from the third current winding will always constitute a combination of additive (120 volt) and subtractive (208 volt) components corresponding to the expression $\sqrt{3} \sin \psi$, where the angle $\psi$ represents a resulting combined angle of the shifted current in the third winding with respect to a 90 degrees vector to the reference voltage vector's angular position.

As shown in the diagram, for the 120 volt load the corrective angle denoted by $\alpha$ is additive by the $\sin \alpha$ component, and for the 208 volt load the corrective angle denoted by $\beta$ is subtractive. Thus the final resulting corrective angle is $(\alpha - \beta) = \psi$ which supplies corrective energization according to the expression $\sqrt{3} \sin \alpha$.

The above illustrations demonstrate that for any power factor loads connected to 120-to-neutral or 208 volt phase-to-phase, the power consumption is exactly measured with the method of the present invention providing a simple and inexpensive structural device to accomplish the desired results. The above can also be established by the principle of superposition.

FIGURE 5 is a vector diagram of the operating currents and voltages when unity-power-factor loads are supplied from line-to-neutral voltage and the corrective amp-turns energization derived from the third current winding is subtractive as compared to the method of FIGURE 3 where it was additive.

In accordance with the basic methods of the invention, the 120 volt reference vector can arbitrarily be selected from either of the two phases. In the former case of FIGURE 3 the reference voltage $E_b$ lagged the other voltage $E_a$. In this case the reference voltage $E_a$ is selected and leads the other phase voltage $E_b$. This change in the reference voltage selection is followed by the requirement that the corrective component current of the additional corrective energization must be lead shifted 30 degrees as compared to the former case with 30° lag shift. This condition is clearly indicated in the diagram where similar vectors to those indicated in FIGURE 3 are designated by the same reference numerals.

In this case the $E_a$ vector is the reference voltage and the $I_b$ current is reversed to have 60° lead angle with the $E_a$ vector. With a 120-to-neutral load of $\alpha$ power-factor angle we see that the $I_b$ current vector has a $(60° - \alpha)$ angle and its projection on the reference voltage vector will result in a higher meter reading, so the corrective energization must correspondingly be subtracted.

The required power reading is "$I_b \cos \alpha$." However, due to the doubling of the amp-turns, and the reflected $\cos(60°-\alpha)$ angle, the actual reflected component would be:

$$2T_b I_b[\cos(60°-\alpha)] = 2T_b I_b[\cos 60° \cos \alpha + \sin 60° \sin \alpha] = T_b I_b[\cos \alpha + \sqrt{3} \sin \alpha] \quad (2)$$

Thus the reading would be too high by the factor $\sqrt{3} \sin \alpha$. Similarly, as shown in the former case, the magnitude of the lead shifted component must be $\sqrt{3}$ time the $I_b$ and will be subtractive as a $\sin \alpha$ function required for full correction for power-factor variation in a manner identical to the former case of FIGURE 3. It is seen that by the 30 degrees lead shifted $I_b$ vector will have an angle of exactly 90 degrees with the $E_a$ reference vector to give a zero watt-component at unity-power-factor loads and for lagging loads the $\sin \alpha$ component vector will be subtractive by having a total angle of $(90+\alpha)$ versus the $E_a$ reference vector.

It is noted that a 30 degree lead shifter would require a separate reactive core in the opposite branch of the shifting device which would be impractical as compared to the former case using a 30° lag shift where the current winding itself constitutes the necessary reactance. The lead shifter is not shown on the drawings, as it is well known to those skilled in the art. FIGURE 5A indicates a phase shifter loop circuit when the current is shifted 30 degrees leading. A reactive core 30 in series with a resistor element 31 forms a first branch which is then shunted by the third current coil 4 forming the second branch of the phase shifter circuit loop.

The above alternate embodiments will equally provide exact power measurements depending on the proper selection of the reference voltage. This fact serves as further proof of the correctness of the principles of the present invention.

It is noted that the phase shifting device having the third current winding shunted by a resistance of low value will constitute a condition like the shorted turns on the current core structure which will make the resulting magnetic fluxes produced by the currents $I_a$, $I_b$ lag their actual respective currents by some angle. Conventionally such a lag effect can easily be compensated for by the meter lag plate or arrangements to provide shifting of the flux due to the $E_a$ voltage as correspondingly required. This adjustment of the potential flux may somewhat affect the requirement for an exact 30 deg. lag shift, therefore further adjustment can be made in the shifting angle to compensate for such deviation of the potential flux position from the quadrature, thereby to re-establish proper flux relationship for correct meter registration. Such adjustments, however, are normal accessories to conventional meters, so it forms no part of the present invention.

As a typical illustrative example to determine the turn ratio of the three current windings it has been indicated that one phase current flowing through winding 2 has two turns, the second phase current flowing through winding 3 has 4 turns, and the corrective third winding has 6 turns. It is assumed that by proper design of the phase shifting device having a sufficiently low resistance as a shunt element, the inductance of the 6 turn current winding will provide the necessary R–L ratio for the required 30 deg. lag shift. It is noted, however, that by a proportionate decrease of the current winding branch current or making or making one third instead of one half of the line current, a correspondingly increased of turns can be substituted for, whereby the further increased reactance can easily accomplish the 30 deg. lag if the final design conditions would require.

Also it is worth mentioning that an adjustable resistor element can be inserted in series wtih the current winding, if desired, to adjust the necessary R–L ratio for the 30 deg. lag shift, this adjustable resistance is not shown on the drawings. The final design must be such that the number of turns and available space conditions on the current core structure are properly selected.

FIGURE 6 is a diagrammatic view of a conventional single stator, single rotor core structure as contemplated to be used in conjunction with the principles of the invention.

The single core structure generally indicated at 21 is comprised of an upper part 22 serving as a voltage electromagnet and to support the voltage winding 23, not shown on the drawing, and a lower part 24 serving as a current electromagnet and as the magnetic core for all three current windings of which 2, 3 and 4, respectively are shown on the drawing, and having two pole faces 25, 26. There is an air gap provided between the voltage and current electromagnet where the induction disc 27 rotates. Since the structure is well known in the present art, no further details are given.

In accordance with the principles of the invention, the three current windings 2, 3, and 4 are disposed in the most suitable order or arrangement so that the highest reactance can be obtained for the increased number of turns of the third winding 4 which forms one branch of the phase shifting device. Otherwise all other structural features of the meter are conventional.

FIGURE 7 is a fragmentary diagram of a simple test method to adjust the corrective phase shifting device. The circuit arrangement of the phase shifting device consist of a resistance element R shunting the third current coil 4, whereby the $I_a$ current is divided to flow through both branches. The lagging shifted component current $I_{a3}$ flow through the third current coil 4. All similar circuit elements are denoted by like reference characters.

In accordance with the principles of the invention when a unity-power-factor load is applied, the 30 degree lag shifted corrective current $I_{a3}$ will assume an exact 90 deg. angle with the reference voltage vector. Accordingly by appyling a unity-power-factor load between phase voltage $E_a$ and neutral $E_n$, the in-phase power component of the corrective current $I_{a3}$ is 90° from the reference voltage vector $E_b$ and so the wattmeter reading will be unaffected by the energization of the third current winding. Thus by connecting a load of established wattage between $E_a$ and $E_n$ a reference is provided for easy adjustment. The adjustment of the phase shifter circuit is accomplished by varying the value of the resistance element R shunting the third current coil 4. Only this single phase shifter adjustment is necessary for all loads of either 120 volt or 208 volt type.

For this purpose a single pole double throw switch generally indicated at 28 is used to by-pass the current from the phase shifter device in one position and is connected in series with the shifter device in the other position to restore the normal operation. It is noted that during the complete testing procedure the closed loop of the shifter device must be maintained as it constitutes an integral part of the meter system and must be included in the final adjustment of the meter. Thus the testing method is as follows:

First the switch is placed in the by-pass position and a unity-power-factor load is connected across phase voltage $E_a$ and neutral and the meter is adjusted as required for a conventional single phase meter as well known to those skilled in the art.

Thereafter using the same load conditions, the switch is thrown to the other position whereby the corrective current $I_{a3}$ is applied to the meter and the shifter is adjusted until the reading is exactly the same as the one obtained for the first switch position and checked for switching in either position. Accordingly it is quite evident that a perfect adjustment of the phase shifter circuit is accomplished when the corrective current $I_{a3}$ of unity power-factor load imposed upon the watthour meter will not affect the meter reading as per principle of the invention. This condition can be tested by opening the by-pass which is identical to putting the single pole double throw switch into the second position. Should any deviation between readings in the first and second position still exist, the shifter circuit must be further adjusted until such deviation entirely disappears.

The above adjustment will operate equally well for all load currents since the shifter circuit without recator core operates substantially linear within the working range of the load currents.

What I claim as new and desire to secure by Letters Patent of the United States is:

1. An induction measuring device for measuring electrical energy in two phases of a 4-wire Y-connected three phase power supply system with neutral comprising, one single stator measuring core structure having disposed thereon a voltage winding and first, second and third current windings, said voltage winding being connected across one of said two phases and neutral, said first current winding being connected in said one of said two phases, said second and third current windings being serially connected in the other of said two phases, means connected to said third current winding for shifting the phase of current flowing therethrough to provide corrective energization, said induction measuring device responsive to the total power supplied from said phases and through said current windings.

2. An induction measuring device for measuring electrical energy in two phases of a 4-wire Y-connected three phase power supply system with neutral comprising, a rotor, one single stator measuring core structure for driving said rotor and having disposed thereon a voltage winding and first, second and third current windings, said voltage winding being connected across one of said two phases and neutral, said first current winding being connected in said one of said two phases, said second and third current windings being serially connected in the other of said two phases, means connected to said third current winding for shifting the phase of current flowing therethrough to provide corrective energization, under identical currents flowing through said first and second windings the ampere-turns ratio through said first, second and third windings being equivalent to the relationship 2, 4 and $\sqrt{3}$, respectively, said induction measuring device responsive to the total power supplied from said phases and through all of said current windings.

3. The structure as defined in claim 2 wherein said single stator measuring core structure constitutes a network watthour meter.

4. An induction measuring device for measuring electrical energy in two phases of a 4-wire Y-connected three phase power supply system with neutral comprising, a rotor, one single stator measuring core structure for driving said rotor and having disposed thereon a voltage winding and first, second and third current windings, said voltage winding being connected across one of said two phases and neutral, said first current winding being connected in said one of said two phases, said second and third current windings being serially connected in the other of said two phases, means connected to said third current winding for shifting the phase of current flowing therethrough by substantially 30 degrees with the current flowing through said second winding to provide corrective energization corresponding to a linear function of $\sqrt{3} \sin \alpha$ having a first load of $\alpha$ power factor angle connected phase-to-neutral, said induction measuring device responsive to the total power supplied from said phases and through all of said current windings.

5. The structure as defined in claim 4 wherein an additional phase-to-phase load is connected between said two phases, whereby said produced corrective energization corresponds to a linear function of $\sqrt{3} \sin \psi$ where angle $\psi$ representing a resulting combined power factor and phase angle between said phases.

6. The structure as defined in claim 4 wherein said single stator measuring core structure constitutes a network watthour meter.

7. An induction measuring device for measuring electrical energy in two phases of a 4-wire Y-connected three phase power supply system with neutral comprising, a rotor, one single stator measuring core structure for driving said rotor and having disposed thereon a voltage winding and first, second and third current windings, said voltage winding being connected across neutral and one of said two phases, the phase angle of said one phase serving as reference vector, said first current winding being connected in said one of said two phases, said second and third current windings being serially connected in the other of said two phases, means connected to said third current winding for shifting the phase of current flowing therethrough to form 90 degrees phase angle with said reference vector to provide corrective energization having effectively zero power component when unity power-factor loads being connected to said phase and neutral, said induction measuring device responsive to the total power supplied from said phases and through all of said current windings.

8. An induction measuring device for measuring electrical energy in two phases of a 4-wire Y-connected three phase power supply system with neutral comprising, a rotor, a single stator measuring core structure for driving said rotor and having disposed thereon a voltage winding and first, second and third current windings, said voltage winding being connected across neutral and one of said two phases, the phase angle of said one phase serving as reference vector, said first current winding being connected in said one of said two phases, said second and third current windings being serially connected in the other of said two phases, said second winding connected in reversed direction having twice the number of turns as said first winding, the current through said second winding having 60 degrees lag angle with said reference vector to provide an in-phase full magnitude energization when unity power-factor load being connected to said phase and neutral, means connected to said third current winding for shifting the phase of the current flowing therethrough to form 90 degrees phase angle with said reference vector to provide corrective energization having effectively zero power component when unity-power-factor load being connected to said phase and neutral, said induction measuring device responsive to the total power supplied from said phases and through all of said current windings.

9. An induction measuring device for measuring electrical energy in two phases of a 4-wire Y-connected three phase power supply system with neutral comprising, a rotor, a single stator measuring core structure for driving said rotor and having disposed thereon a voltage winding on one portion thereof and first, second, and third current windings all disposed on a separate common other portion thereof, said voltage winding being connected across neutral and the voltage of one of said two phases serving as a reference voltage, said first current winding being connected in said one of said two phases, said second and third current windings being serially connected in the other of said two phases, said second winding connected in reversed direction and having twice the number of turns as said first winding, means shifting the phase of current flowing through said third winding providing a lag shift substantially equal to 30 degrees with said phase current to provide corrective energization for power factor angle $\alpha$ variations corresponding to a linear function $\sqrt{3} \sin \alpha$ having non-unity power factor first loads connected to said phase and neutral, said induction measuring device responsive to the total power supplied from said phases and through all of said current windings.

10. The structure as defined in claim 9 wherein an additional phase-to-phase load is connected between said two phases, whereby said produced corrective energization corresponds to a linear function of $\sqrt{3} \sin \psi$ where angle $\psi$ representing a resulting combined power factor and phase angle between said phases.

11. An induction measuring device for measuring electrical energy in two phases of a 4-wire Y-connected three phase power supply system with neutral comprising, a rotor, a single stator measuring core structure for driving said rotor having disposed thereon a voltage winding on one portion thereof, and first, second and third current windings all disposed on a separate common other portion thereof, said voltage winding being connected across neutral and the voltage of one of said two phases serving as reference voltage, said first current winding being connected in said one of said two phases, said second and third current windings being serially connected in the other of said two phases, the angular position of said reference voltage driving the current through said first winding is lagging the voltage driving the current through said second winding, a resistance element shunting said third winding to constitute one branch of a phase shifting circuit, said third winding being included in the other branch of said phase shifting circuit providing a lag shift of substantially 30 degrees with the current flowing through said second winding, said third winding having a substantially high reactance due to increased number of turns required to provide corrective energization, said induction measuring device responsive to the total power supplied from said phase and through all of said current windings.

12. The structure as defined in claim 11 wherein the angular position of said voltage driving the current through said first winding leads the voltage driving the current through said second current winding, said phase shifting circuit comprising a reactive circuit element shunted across said third winding having a resistance element in series to provide a lead shift of current in said third winding being substantially 30 degrees with the current flowing through said second winding.

13. The structure as defined in claim 11 wherein said single stator measuring core structure constitutes a network watthour meter.

14. An induction measuring device for measuring electrical energy in two phases of a 4-wire Y-connected three phase power supply system with neutral comprising, a rotor, one single stator measuring core structure for driving said rotor having disposed thereon a voltage winding on one portion thereof and first, second and third current windings all disposed on a separate common other portion thereof, said voltage winding being connected across neutral and the voltage of one of said two phases serving as reference voltage, said first current winding being connected in said one of said two phases, said second and third current windings being serially connected in the other of said two phases, the angular position of said reference voltage driving the current through said first winding is lagging the voltage driving the current through said second winding, a resistance element shunting said third winding to constitute one branch of a phase shifting circuit, said third winding of sufficiently high reactance due to increased number of turns being included in the other branch of said phase shifting circuit, thereby to provide a lag shift of substantially 30 degrees with the current flowing through said second winding producing the required corrective energization, the turns ratio of said first, second and third winding being in a ratio relationship of 2, 4 and 6 respectively, said induction measuring device responsive to the total power supplied from said phases and through all of said current windings.

15. The structure as defined in claim 14 further comprising means for adjusting said phase shifting circuit by varying the value of said resistance element shunting said third winding, said means further comprising a double throw switching device having first and second positions operatively connected to said phase shifting circuit, said first position allowing full by-pass of said phase current while supplying a unity power-factor phase-to-neutral load to obtain a first reading of said induction measuring device, said second position allowing full flow of said unity power-factor phase current through said phase shifting circuit for normal operation to provide a second reading of said measuring device, whereby the equalizing of said both readings of said induction measuring device being effected by operating said switching device in either of said two positions and corresponding adjustment of said phase shifting circuit by varying said resistance element.

16. The structure as defined in claim 14 wherein said single stator measuring core structure constitutes a network watthour meter.

References Cited

UNITED STATES PATENTS

| | | | |
|---|---|---|---|
| 2,997,653 | 8/1961 | Becker et al. | 324—107 |
| 3,155,903 | 11/1964 | Petzinger | 324—107 |

ALFRED E. SMITH, Primary Examiner

U.S. Cl. X.R.

324—138, 142